United States Patent [19]
Olsen et al.

[11] Patent Number: 5,616,366
[45] Date of Patent: Apr. 1, 1997

[54] METHOD FOR PRODUCING LOW POROSITY ELECTRODE

[75] Inventors: Ib I. Olsen; Gert L. Jensen, both of San Jose, Calif.

[73] Assignee: Valence Technology, Inc., Henderson, Nev.

[21] Appl. No.: 589,995

[22] Filed: Jan. 23, 1996

Related U.S. Application Data

[63] Continuation of Ser. No. 230,171, Apr. 20, 1994, abandoned.

[51] Int. Cl.$^6$ ............................. C08F 2/48; B05D 5/12; B05D 3/12; H01M 6/18
[52] U.S. Cl. .......................... 427/508; 427/498; 427/77; 427/365; 427/366; 427/385.5; 429/192; 429/193; 429/197
[58] Field of Search ................. 427/77, 78, 365, 427/366, 384, 385.5, 498, 496, 500, 504, 510, 512, 508; 429/191, 192, 193, 194, 195, 196, 197, 198

[56] References Cited

U.S. PATENT DOCUMENTS

| | | | |
|---|---|---|---|
| 4,009,052 | 2/1977 | Whittingham. | |
| 4,118,550 | 10/1978 | Koch. | |
| 4,421,579 | 12/1983 | Covitch et al. | 204/98 |
| 4,517,265 | 5/1985 | Belanger et al.. | |
| 4,589,197 | 5/1986 | North | 429/192 |
| 4,617,231 | 10/1986 | Hamada et al. | 427/366 |
| 4,792,504 | 12/1988 | Schwab et al.. | |
| 4,812,376 | 3/1989 | Rudolph. | |
| 4,824,745 | 4/1989 | Ogawa et al. | 429/213 |
| 4,824,746 | 4/1989 | Belanger et al. | 427/366 |
| 4,830,939 | 5/1989 | Lee et al.. | |
| 4,879,190 | 11/1989 | Lundsgaard. | |
| 4,935,317 | 6/1990 | Fauteux et al.. | |
| 4,987,042 | 1/1991 | Jones et al.. | |
| 4,990,413 | 2/1991 | Lee et al.. | |
| 5,023,149 | 6/1991 | MacDiarmid et al. | 429/213 |
| 5,028,500 | 7/1991 | Fong et al.. | |
| 5,037,712 | 8/1991 | Shackle et al.. | |
| 5,183,543 | 2/1993 | Toyosawa et al. | 204/242 |
| 5,229,225 | 7/1993 | Shackle. | |
| 5,238,758 | 8/1993 | Lee et al.. | |
| 5,262,253 | 11/1993 | Golovin | 429/192 |
| 5,294,501 | 3/1994 | Shackle et al. | 429/192 |
| 5,358,801 | 10/1994 | Brodd | 429/194 |
| 5,384,213 | 1/1995 | Olsen | 429/192 |
| 5,418,089 | 5/1995 | Chaloner-Gill et al. | 429/191 |
| 5,455,127 | 10/1995 | Olsen et al. | 429/191 |
| 5,464,707 | 11/1995 | Moulton et al. | 429/212 |
| 5,501,921 | 3/1996 | Olsen | 429/192 |

OTHER PUBLICATIONS

*The Condensed Chemical Dictionary*, 10$^{th}$ ed., G.G. Hawley ed. Van Nostrand Reinhold Co., NY, NY 1981 (no month) except–p. 564.

*Primary Examiner*—Marianne Padgett
*Attorney, Agent, or Firm*—Linda M. Deschere

[57] ABSTRACT

In a new process for making an electrode current collector assembly, an electrode composition is mixed with a volatile casting solvent and is coated onto a substrate. Then, the coated substrate is heated to drive off a major portion of the volatile casting solvent. Next, force is applied on an external surface of the coating and directed toward the substrate so as to compact the coating and reduce the volume of pore spaces in the coating. An electrolyte composition may be applied to the compacted electrode composition either before or after curing. The electrode and electrolyte compositions are each cured. In a final step, a counter-electrode layer is applied onto the electrolyte composition to form a cell assembly.

20 Claims, 2 Drawing Sheets

METHOD FOR PRODUCING LOW POROSITY ELECTRODE

REFERENCE TO CO-PENDING APPLICATION.

This a continuation application of U.S. patent application Ser. No. 08/230,171 filed on Apr. 20, 1994 now abandoned.

FIELD OF THE INVENTION

The present invention relates to the manufacture of a solid state electrochemical cell, and more particularly, a method for producing a composite cathode and current collector.

BACKGROUND OF THE INVENTION

Cells and batteries based on metals such as those having an alkali metal anode (negative electrode) and finely divided metal oxide cathode (positive electrode) are known. Particularly favored are such cells comprising a lithium foil anode active material of a thickness of about 75 microns, or a composite intercalation anode layer of the same thickness; and an intercalation cathode layer of a similar thickness which contains finely divided transition metal oxide active material, electrically conductive carbon and solid electrolyte material. An electrolyte layer having a thickness of about 25 microns is positioned between the anode and cathode and often comprises an ion conducting polymer such as polyethylene oxide complexed with an ionizable alkali metal, preferably, lithium salt. The electrolyte layer separates the anode and cathode from one another while providing transport of ions between the anode and cathode. Typically, a current collector of conductive metal is positioned on the sides of both of the electrodes away from the electrolyte layer.

The cathode (positive electrode) provides for storage of lithium ions released from the anode (negative electrode) during discharge of the battery. Such ions are releasably retained by the cathode and then are transported back to the anode during charge. The cathode is a composite of ionically and electrically conductive materials disposed between the electrolyte layer and cathode current collector plate to provide the necessary transport between such components of the cell. The composite cathode should have a high solid and active material content and good mechanical strength. This is very difficult to achieve. There are two interfaces on the cathode side of the cell, the electrolyte-cathode interface and the cathode-current collector interface. It is difficult to achieve good contact between the cathode material and the cathode current collector. Failure to achieve good contact leads to an overall increase in cell impedance and makes it difficult to recharge the cell.

It is desirable to increase the solid, active material content of the composite cathode and to enhance contact between the composite cathode material and the current collector.

It is also desirable to have a cost-effective and convenient method for manufacturing cells and batteries which reduces waste and unnecessary thickness of the cathode layer, and particularly the composite cathode material.

SUMMARY OF THE INVENTION

In accordance with the invention, an electrode is prepared by applying a solvent casted cathode composition to a substrate and then evaporating the volatile solvent and consolidating the composition to enhance the solids content, reduce porosity, and improve adherence to the substrate. It is preferred that the composition contain a radiation curable precursor component, so that in the preferred method, the solids are consolidated prior to curing by radiation or other means.

In a preferred method, an electrode precursor composition is formed by combining the electrode composition with a volatile solvent. The solvent is present in an amount sufficient to reduce the viscosity of the electrode composition to render it coatable or enhance its coatability. The amount of solvent will depend upon the components of the composition and the coating method chosen. A suitable proportion of solvent is, on the basis of 100 total parts by weight of solvent and electrode composition, at least 20 parts solvent. It is thought that the maximum amount of solvent that is required is about 70 parts by weight. The electrode composition in its uncured state is often referred to as a precursor composition.

The electrode composition is coated on an electrically conductive substrate using extrusion techniques, knife coater, reverse roll coating, or other coating methods. Next, the coated substrate passes a heat source to drive off at least a portion of the volatile solvent. The heat source may be heated air, infrared lamps or heated rollers. Then, the electrode composition is compacted by compression to reduce its porosity. The compression step is accomplished, for example, by essentially constant pressure via hydraulic piston or by positioning between rollers with a known gap to define a constant thickness. The evaporation and compression steps are preferably repeated until essentially all of the volatile solvent is removed.

It is possible to achieve removal of greater than 90% of the solvent initially present and to achieve a composition having pores occupying no more than about 10% of the combined volume of the electrode composition, any remaining solvent and the pores. This corresponds to a porosity of 10% or less. It is preferred to achieve removal of greater than 95% of the solvent (less than 5% remaining) and a porosity less than 5% (pores occupying less than 5% of the composition. On the basis of the combined weight of electrode composition and solvent, any remaining solvent represents, desirably, no more than about 10% and preferably no more than about 5%.

In a final step the coating is exposed to irradiation which will crosslink radiation curable monomers/prepolymers to form an interpenetrating network with good mechanical properties. The solvent removal in combination with the compacting causes very effective and efficient densification of the electrode composition.

It is preferred that the electrode composition comprise an active cathode or anode material, an electrically conductive material, and an ionically conductive material. Suitable active materials for the positive electrode are metal intercalation compounds; for the negative electrode it can be any of a variety of carbons, polymer intercalation compounds, and various metals. Suitable electrically conductive materials are particles of carbon and electrically conductive polymers having conjugated network of double bonds; and ionically conductive material comprise an ionically conductive polymer matrix in combination with a conductive powder or conductive liquid containing an alkali metal salt. The ionically conductive polymer is sometimes referred to as an electrolyte or electrolyte/binder; and is a polyethylenically unsaturated monomeric or prepolymeric material having at least one heteroatom and polymerizable moiety.

The method of the invention compacts the cathode composition to eliminate or at least reduce the presence of pores or void spaces prior to application of the electrolyte.

Accordingly, it is an object of the present invention to provide a densified composite electrode composition which is virtually pore free and has improved contact with the electrode current collector.

These and other objects, features and advantages will become apparent from the following description of the preferred embodiments, appended claims and accompanying drawings.

DETAILED DESCRIPTION OF THE PREFERRED EMBODIMENTS

Figure 1:
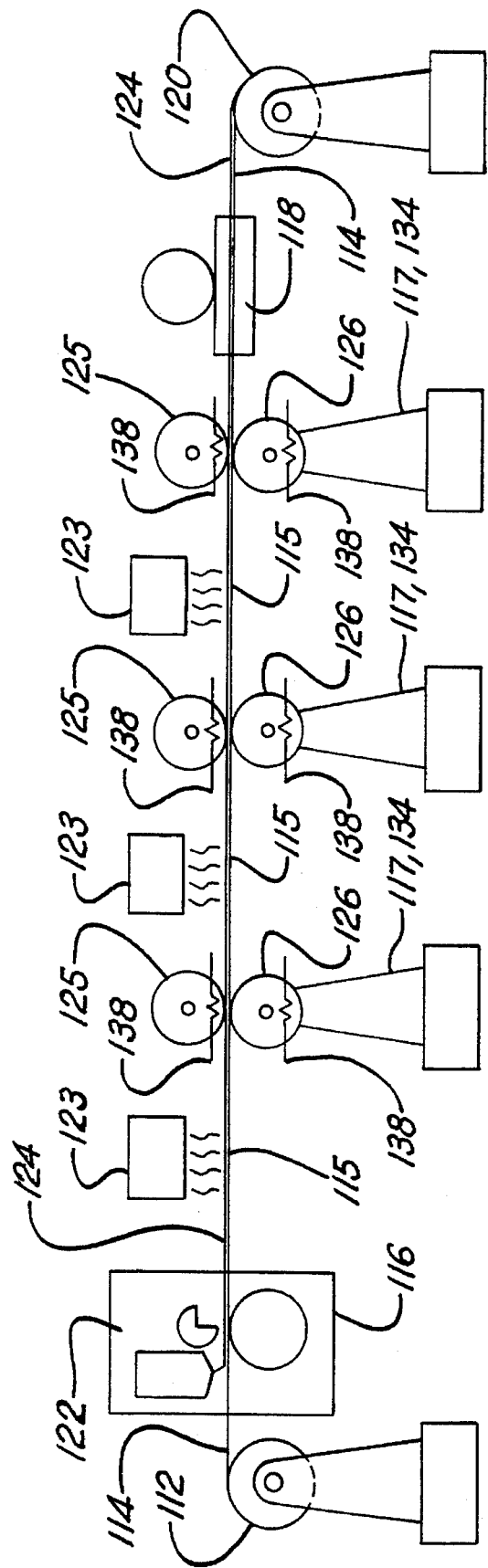
FIGS. 1 and 3–8 illustrate one process for producing a compacted electrode for a cell or battery illustrated in FIG. 2 including the steps of applying a composition to a substrate (FIGS. 1, 3 and 4); heating the applied composition to evaporate the solvent (FIG. 1); applying force or pressure by various means to such composition (FIGS. 1, 5, 6 and 7); applying the electrolyte 16 (FIG. 8).

The invention provides a new method for forming composite electrode compositions from solvent casted precursors. Such precursors are preferably radiation curable. In the new method, an electrode composition is mixed with a volatile casting solvent and is coated onto a substrate. Then, the coated substrate is heated to drive off a major portion of the volatile casting solvent. Next, force is applied on an external surface of the coating and directed toward the substrate so as to compact the coating and the reduce the volume of pore spaces in the coating. An electrolyte composition may be applied to the compacted electrode composition either before or after curing. The electrode and electrolyte compositions are each cured. In a final step, a counter-electrode layer is applied onto the electrolyte composition to form a cell assembly. The method will be more particularly described with reference to forming positive electrodes (cathodes) which are most commonly formed from solvent casted precursors. The method is equally applicable to forming negative electrodes (anodes).

In accordance with the invention, an electrode is prepared by applying a solvent casted cathode composition to a substrate and then evaporating the volatile solvent and consolidating the composition to enhance the solids content, reduce porosity, and improve adherence to the substrate. It is preferred that the composition contain a radiation curable precursor component, so that in the preferred method, the solids are consolidated prior to curing by radiation or other means.

In a preferred method, an electrode precursor composition is formed by combining the electrode composition with a volatile casting solvent. The solvent is present in an amount sufficient to reduce the viscosity of the electrode composition to render it coatable or enhance its coatability. The amount of solvent will depend upon the components of the composition and the coating method chosen. A suitable proportion of casting solvent is, on the basis of 100 total parts by weight of casting solvent and electrode composition, at least 20 parts casting solvent. It is thought that the maximum amount of casting solvent that is required is about 70 parts by weight. The electrode composition in its uncured state is often referred to as a precursor composition.

The electrode composition is coated on an electrically conductive substrate using extrusion techniques, knife coater or other coating methods. Next, the coated substrate passes a heat source to drive off at least a portion of the volatile solvent. The heat source may be heated air, infrared lamps or heated rollers. Then, the electrode composition is compacted by compression to reduce its porosity. The compression step is accomplished, for example, by essentially constant pressure via hydraulic piston or by positioning between rollers with a known gap to define a constant thickness. The evaporation and compression steps are preferably repeated until essentially all of the volatile solvent is removed.

It is possible to achieve removal of greater than 90% of the solvent initially present and to achieve a composition having pores occupying no more than about 10% of the combined volume of the electrode composition, any remaining solvent and the pores. This corresponds to a porosity of 10% or less.. It is preferred to achieve removal of greater than 95% of the solvent (less than 5% remaining) and a porosity less than 5% (pores occupying less than 5% of the composition. On the basis of the combined weight of electrode composition and solvent, any remaining solvent represents, desirably, no more than about 10% and preferably no more than about 5%.

In a final step the coating is exposed to irradiation which will crosslink radiation curable monomers/prepolymers to form an interpenetrating network with good mechanical properties. The solvent removal in combination with the compacting causes very effective and efficient densification of the electrode composition.

The polymerizable electrolyte and cathode compositions described herein may be polymerized (cured) by radiation, chemical or other means. Curing by heat is known but it may be less desirable and may be incompatible with the overall results desired. In a particularly preferred embodiment the compositions are cured by exposure to an electron beam. The electron beam is capable of generating free radicals and initiating polymerization without any photoinitiator. To use other forms of radiation, a photoinitiator may be required. Similarly to cure the compositions by heating, a thermal initiator is required. Examples of thermally cured polymers are set forth in U.S. Pat. No. 4,792,504 to Schwab et al., which is hereby incorporated by reference.

The basic method and apparatus used in the method are as shown in FIG. 1. Before further describing the preferred method, the components of the electrochemical cell containing the electrodes will be described.

Figure 2:
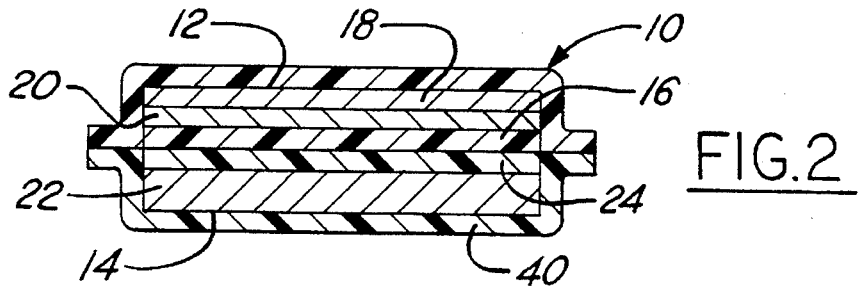
FIG. 2 is an illustration of a cross-section of a thin battery or cell embodying the invention.

FIG. 2 shows an electrochemical cell or battery 10 which has a negative electrode side 12, a positive electrode side 14, and an electrolyte or electrolyte/separator 16. In accordance with common usage, a battery may consist of one cell or multiple cells. The negative electrode is the anode during discharge, and the positive electrode is the cathode during discharge. The negative electrode side includes current collector 18, typically of nickel, stainless steel, and/or copper foil, and a body of negative electrode material 20. The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, stainless steel, and/or copper foil, or such foils having a protective conducting coating foil, and a body of positive electrode composite cathode material 24. The cathode composition 24 and current collector 22 will be more specifically described below. The positive electrode material 24 is sometimes simply referred to as the positive electrode or positive electrode composition. The electrolyte 16 is typically a solid or liquid electrolyte. Suitable solid or liquid electrolytes are known, with polymer electrolytes presently being favored. A variety of liquid, solid and polymer electrolytes are described in U.S. Pat. Nos. 4,009,052, 4,118,550, 4,792,504, 4,830,939, 4,990,413, 4,935,317 5,037,712 and 5,229,225 each of which is incorporated herein by reference in its entirety. The preferred electrolyte is a solid organic polymer matrix containing an ionically conducting powder or liquid with an alkali metal salt and the liquid is an aprotic polar solvent. Other electrolytes are liquid with dissolved metal salt usually used with a separator between the electrodes. Cell 10 also includes a protective covering (40) which functions to prevent water and air from contacting the reactive layers of the cell 10.

Cell 10 is preferably a laminar thin cell type including a lithium anode (negative electrode 20). Laminar thin-cell batteries containing lithium anodes are know in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes lithium as the electrochemically active component, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

The anode is typically comprised of a compatible anodic material which is any material which functions as an anode in a solid electrolytic cell. Such compatible anodic materials are well known in the art and include by way of example, lithium, lithium alloys such as alloys of lithium with aluminum, mercury, tin, zinc, and the like, and intercalation based anodes such as carbon, tungsten oxides, conductive polymers such as polypyrrole, and the like. These are known in the art and are discussed in U.S. Pat. Nos. 4,517,265, 5,028,500, 5,238,758, 4,812,376, and 4,987,042 each of which is incorporated by reference herein in its entirety.

Current Collector

Figure 3:
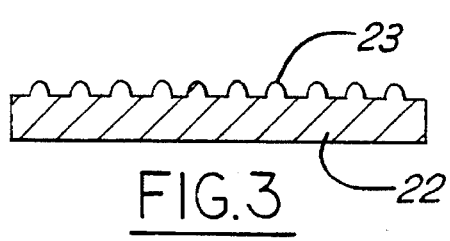

The process of the invention forms a cathode composition 24 on the current collector 22 which may be a sheet of metal foil, an electrically conductive screen, grid, expanded metal, etched foil, electrodeposited film, woven or non-woven conductive fabric. In practice, it is preferred to use as the current collector a thin metal foil having a metal, preferably the same metal, electrodeposited on the surface thereof which will contact the cathode layer. A preferred metal is known as surface-treated nickel. A microroughened or etched surface 23 on the current collector 22 enables better adherence of the cathode composition 24 to the current collector. (FIG. 3)

In practice, the thickness of current collector 22 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely light-weight and can be utilized in extremely thin layers. An example of such a material is a polyethylene terephthalate substrate having electrodeposited thereon a first layer of copper and a second layer of nickel. The thickness of such a layer is typically on the order of about one micron in magnitude but it may be as thin as practicable to minimize overall thickness of the cell.

Cathode Composition

Various cathode compositions are known in the art. Such compositions are presently prepared in conventional process without benefit of dilution with a volatile casting solvent. Such conventional compositions are typically a highly viscous paste or gel applied onto the microroughened surface of current collector 22. In one embodiment, cathode composition 24 is combined with the volatile casting solvent of the invention and applied to a current collector 22. The cathode composition alone (not including the volatile solvent) comprises the following typical components:

1) an active cathodic material such as a transition metal chalcogenide, or an intercalation compound;

2) an electrically conductive filler or an electrically conductive polymer such as polypyrrole, polyacetylene, polyaniline, etc.; and 3) an ionically-conductive electrolyte (described below).

The electrically conductive filler is usually carbon particles. Certain conductive polymers (which are characterized by a conjugated network of double bonds) like polypyrrole and polyactylene may also be used for the electrically conductive filler. The active material, conductive electrolyte, casting solvent and method of invention will now be described.

Active Material

Intercalation compounds and electrically conductive materials useful in the present invention are known in the art. Representative examples of transition metal oxides and sulfides useful as active cathode materials are $V_6O_{13}$, $MoO_2$, $TiS_2$, $MnO_2$, $V_2O_5$, $MoS_3$, $Cr_3O_6$, $Li_xV_3O_8$, $FeS$, $NiS$, $CoO$, and $CuO$. Other examples are described in the literature. The active cathode material preferably has a particle size of less than 1 micron but can range up to 20 microns. A particularly preferred intercalation compound is $V_6O_{13}$ having a particle size less than 5 microns, and particularly less than one micron. $V_6O_{13}$ comprises between 25 and 85% by weight of the entire cathode composition, and preferably between 45 and 75%.

It is particularly desirable to maintain good contact between the cathode material and the carbon particles while maximizing the amount of cathode material available for ionic interaction. If an excess of carbon is present which does not significantly improve electrical conductivity then it reduces capacity due to the reduced amount of intercalation compound present.

The optimum ratio of carbon to a transition metal chalcogenide will vary with particle size and processing or grinding techniques used. The carbon black and metal oxide are ball milled together. It is preferred that part of the carbon be included for the milling. The rest may be added later. If too much carbon is present, the cathode composition may have a sand-like consistency.

Conductive Electrolyte

The third component of the cathode composition is an ionically conductive electrolyte. This material is typically prepared from a composition which comprises a liquid, monomeric or prepolymeric polymerizable compound, and a solution of an ionizable alkali metal salt, or solid alkali metal salt, or solid ionically conductive powders which are maintained in the ionically conductive polymer matrix. Suitable compositions are as described in U.S. Patents which were earlier incorporated herein by reference in their entirety.

The ionically conductive polymer is often simply referred to as an electrolyte or electrolyte/binder. It should be noted that the electrolyte/binder described herein is usable for the anode composition, the cathode composition, and for the electrolyte separator 16 disposed between the negative and positive electrode compositions 20 and 24. Accordingly, the properties of the electrolyte/binder (eb) polymer will be described with reference to all uses.

The (electrolyte/binder) polymers have repeating units containing at least one heteroatom such as an oxygen or nitrogen atom as described in U.S. Pat. No. 4,990,413 and as set forth below. They can be represented as polymers having the repeating unit

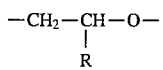

wherein R is hydrogen or a group Ra, —CH$_2$ORa, —CH$_2$OReRa, —CH$_2$N(CH$_3$)$_2$, in which Ra is an alkyl group containing 1 to 16 carbon atoms and preferably 1 to 4 carbon atoms or a cycloalkyl group containing 5 to 8 carbon atoms, and Re is an ether group of formula —CH$_2$—CH$_2$O$_p$— wherein p is a number from 1 to 100, preferably 1 or 2:

or having the repeating unit

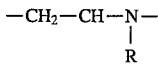

wherein R is Ra or ReRa, as defined above; or having a repeating unit

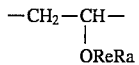

wherein Re and Ra are as defined above. Copolymers of the above polymers may also be useful.

Ionizable alkali metal and alkaline earth salts useful in the electrolyte include those salts conventionally used in electrochemical cells. Representative examples are Li+, Na+, K+, Mg$^2$+, Ca$^2$+, and ammonium salts of less mobile anions of weak bases having a large anionic radius. Examples of such anions may be selected from the group consisting of I—, Br—, SCN—. C10$_4$—, BF$_4$—, PF$_6$—, AsF$_6$—, CF$_3$COO—, CF$_3$SO$_3$—, CF$_3$CO$_3$—, B$_{12}$H$_{12}$$^{2-}$, B$_{10}$Cl$_{10}$$^{2-}$, and Bϕ$_4$—, where ϕ is C$_6$H$_5$, an alkyl chain or an aryl chain, wherein such salt cation and anion are maintained in stoichiometric amounts. More specific examples are: LiAsF$_6$, LiClO$_4$, NaClO$_4$, LiF$_3$SO$_3$, LiBF$_4$, and the preferred LiPF$_6$.

The solvent for the salt can be any low volatile aprotic polar solvent. Preferably, these materials are characterized by a boiling point greater than about 80° C. Low volatility simplifies manufacture and improves shelf life. If the polymeric network is formed by radiation polymerization, the solvent should be inert to the radiation and likewise if the network is formed by thermal polymerization, the solvent should be inert in this regard. In particular, the solvent should not scavenge free radicals. Representative examples are propylene carbonate, ethylene carbonate, gamma-butyrolactone, 1,3-dioxolane, dimethyl sulfoxide, hexamethyl phosphotriamide, and 3-methyl- tetrahydrothiophene -1,1 dioxide.

Compounds which yield a conductive polymer contain a heteroatom capable of forming donor-acceptor bonds with the alkali metal cation. Useful polymerizable compounds are as described in U.S. Pat. No. 4,935,317 and as set forth below.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor-acceptor bonds with an alkali metal cation and are terminated by polymerizable moieties. These compounds yield a conductive supportive matrix. More specifically, they are preferably low molecular weight oligomers of the formulae (I)–(III) below:

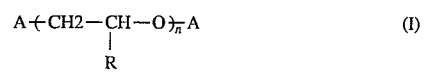 (I)

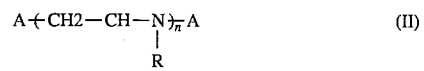 (II)

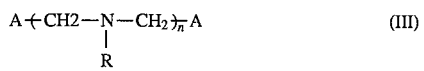 (III)

where n is about 3 to 50 and R is hydrogen or a C1–C3 alkyl group, which are terminated by ethylenically unsaturated moieties or glycidyl moieties represented by A.

A particularly useful group of polymerizable compounds is obtained by reacting a polyethylene glycol with acrylic or methacrylic acid. Also useful in the present invention are curable materials such as acrylated epoxies, eg Bisphenol A epoxy diacrylate, polyester acrylates, copolymers of glycidyl ethers and acrylates or a vinyl compound such as N-vinylpyrrolidone. The latter provide a non-conductive matrix.

Preferably, the aforementioned polymerizable polyethylenically unsaturated compounds have a molecular weight of about 200 to 2,000 and more preferably 200 to 800. Still more preferably they are liquids at temperatures less than 30° C. Examples of curable materials include polyethylene glycol-300 diacrylate (average PEO molecular weight of about 300), polyethylene glycol 480 diacrylate (average PEO molecular weight of about 480) and the corresponding methacrylates.

It may be desirable to include a curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as trimethylolpropopane triacrylate (TMPTA), trimethylolpropane ethoxylated triacrylates (TMPEOTA) or trimethylolpropanepropoxy triacrylate may be used to introduce crosslinking of the polymer. Monoacrylates may be used in an amount of about 5 to 50% by weight based on the total amount of radiation polymerizable material. The triacrylates are used in amounts of about 2 to 30% by weight on the same basis.

One radiation curable polymer composition contains polyethylene oxide (PEO), polyethylene glycol diacrylate, (PEG-DA), trimethylolpropane ethoxylated triacrylate (TMPEOTA), LiCF$_3$SO$_3$ and a suitable ionic conductive solvent such as tetraglyme or propylene carbonate (PC).

TABLE I

| Typical Cathode Composition | Percent Weight |
| --- | --- |
| Active Material | 45.0 |
| Carbon | 10.0 |
| Propylene Carbonate (PC) | 33.0 |
| PolyEthylene Oxide (PEO) | 1.0 |
| PolyEthyleneGlycolDiAcrylate (PEGDA) | 9.0 |
| TriMethylPolyEthylene Oxide TriAcrylate (TMPEOTA) | 2.0 |

The Solvent

The cathode composition as exemplified in Table I is dispersed in a volatile solvent prior to coating onto a substrate or current collector 22. The volatile solvent must be chemically inert with respect to the components of the cathode composition and preferably have a boiling point between 40° C. and 100° C., and more preferably less than 80° C. Examples of suitable solvents include tetrahydrofuran, dimethyl ether, methyl formate, acetone, low boiling point alcohols and low boiling point hydrocarbons (n-hexane, n-heptane, etc.). Other solvents, not specifically listed above, may be selected as long as they are chemically inert low boiling point liquids. Use of a volatile solvent provides benefits in that the viscosity of the coating composition is reduced, making it much easier to coat. In the method of the invention, the solvent is evaporated at a critical stage to provide a higher amount of active cathode solids than would otherwise be present in the final composition. This increases the amount of active composition present per unit area as compared to cathode compositions which are not solvent cast/coated as in the invention. Accordingly, the electronic efficiency of the cell per unit area can be improved. It should be noted that the volatile casting solvent is different from the aprotic polar solvent which forms a part of the electrode's conductive electrolyte composition. A suitable proportion of casting solvent is, on the basis of 100 total parts by weight of casting solvent and electrode composition, at least 20 parts casting solvent. It is thought that the maximum amount of casting solvent that is required is about 70 parts by weight. The electrode composition in its uncured state is often referred to as a precursor composition.

Coating: Evaporation and Compacting

The electrode/current collector assembly which includes the electrode composition, (i.e., cathode or anode) carried on the conductive substrate is prepared in a series of steps and then the composition is at least partially cured.

Figure 4:
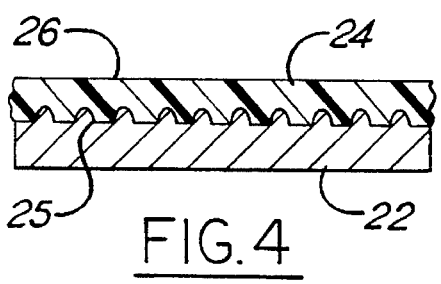

Referring to FIGS. 3 and 4, an electrode/composition dispersed in solvent is coated as a thin film onto current collector 22 having a microroughened surface 23 such as surface treated nickel, e.g., nickel foil having nickel dendrites electrodeposited on the surface. Coating may be accomplished using conventional coating techniques such as a doctor blade, reverse roll coating, or an extrusion method. In practice, the optimum thickness ranges between about 25 and about 250 microns. The applied electrode layer 24 has an internal surface 25 facing the roughened surface 23 of the current collector 22 and an external surface 26 opposite the internal surface.

Next, the solvent is evaporated. Evaporation may be accomplished either by maintaining the coated current collector 22 at ambient conditions for an extended period of time, or more preferably, by heating the electrode composition coated current collector 22 to above the boiling point of the volatile solvent. It is thought that the maximum temperature the order of 110° C. as a higher temperature is not necessary and may cause extensive evaporation of the less volatile aprotic solvent.

Figure 5:
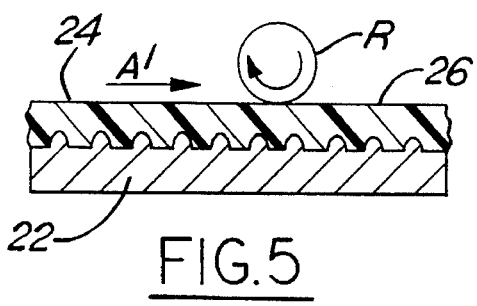

Then, with at least a portion of the volatile solvent removed, the electrode composition is compacted. This may be accomplished by means of force of pressure roller R which traverses the exterior surface of the electrode composition in the direction of arrow A to cause a compression of the electrode composition 24 and better adherence to the current collector 22. (FIG. 5) The smooth, continuous surface 26 produced after such rolling enables a very thin electrolyte layer to be coated thereon.

The applied force or pressure functions to substantially eliminate pore spaces in the cathode composition and increases solids content while at the same time improving adherence to the current collector.

Figure 6:
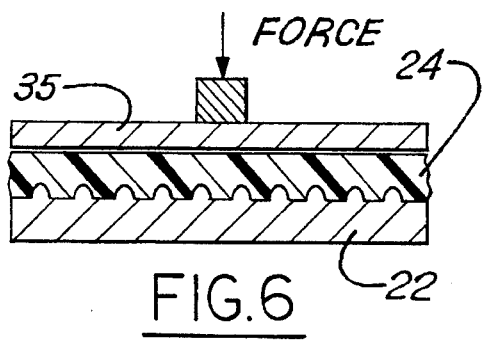

As an alternative to a pressure roller which traverses the surface of the electrode composition, there may also be used a press 35 (FIG. 6), weight or a blunt instrument having a leading edge which moves along the surface applying pressure to compact the electrode composition. A continuous belt and drum combination may also be used. The belt is continuously rolled on the surface of the releasable layer and taken up by a drum in combination with a suitable drive.

Figure 7:
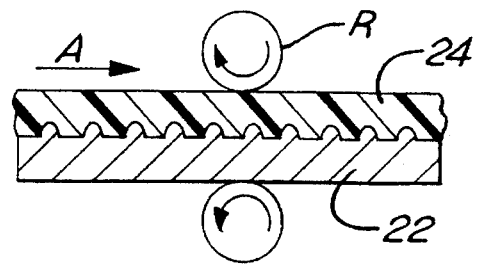

Those skilled in the art will understand that it is preferred to use more than one roller, one disposed on either side of the electrode/current collector where one pressure roller contacts the external surface 26 of the electrode composition 24 and the other pressure roller contacts the current collector 22 as shown in FIG. 7.

Curing

After compacting, the electrode composition is partially or totally cured by exposure to actinic radiation, heating, or by utilizing a chemical polymerization method. It has been found that, in the case of a typical cathode composition, exposure to an electron beam operating at a power of 3 to 9M rad is useful. Alternatively, an ultraviolet source may be selected. If an ultraviolet source is selected, the monomer preferably includes an ultraviolet initiator of the type commonly known in the art such as thioxanthone initiators. Similarly, if thermal curing is selected, the composition should include a thermal initiator. Curing polymerizes and crosslinks and thereby solidifies the monomeric material by conversion to a polymeric form.

A partial curing step (as opposed to full curing) may be particularly desirable as this enables the cathode layer to remain somewhat tacky when the electrolyte layer is applied. This enables better adherence between the layers.

Electrolyte Application

The aforementioned steps provide a densified electrode composition ready for application of an electrolyte. It should be noted that the electrolyte composition 16 may be applied onto an electrode composition, such as the cathode composition, either before or after total or partial curing of the electrode and electrolyte.

The electrolyte can be extruded and coated in a very thin layer typically ranging from about 5 to about 50 microns. When the electrolyte 16 is coated onto the external surface 26 of the cathode composition 24, it is coated in an uncured viscous and often substantially liquid state. It completely covers the cathode composition layer to prevent protrusion of cathode composition components through the electrolyte layer.

Apparatus

Referring to FIG. 1 an apparatus 100 for forming an electrode layer on a substrate 114 is schematically illustrated. Apparatus 100 includes spool 112 which feeds substrate 114 to cathode application station 116, to heat stations 115 and compacting stations 117, to curing station 118 and then onto receiver spool 120. Receiver spool 120 is power driven and pulls substrate 114 past each station. Cathode coating station 116 includes an applicator 122 which applies a layer of cathode composition 124 onto substrate sheet 114. Still referring to FIG. 1, apparatus 100 also includes heat sources 123 which function to heat a surface of the cathode composition 124 so as to remove at least a portion of volatile solvent. The substrate moves past compacting stations 117. Preferably, each of the compacting stations contain opposed rollers 125, 126. The roller 126 is mounted on a support 134 which permits adjustment of the roller 126 with respect to the substrate 114, spools 112, 120 and roller 125 to apply force against an external surface of the cathode composition and toward the substrate. Substrate 114 carrying cathode composition 124 is thus pressed between rollers 125 and 126. The spools 112, 120, and rollers 125, 126 achieve appropriate degree of tension and compression for application of force to compact and densify the cathode composition 124. In a preferred process, the rollers 125, 126 rotate at a speed which revolutions advances the substrate 114 at a rate of approximately 1 to 1,000 meters per minute. Optionally, the 5 rollers 125, 126 are heated, although this is not critical. In another alternative, the heating stations 115 are eliminated and the solvent is evaporated while being compressed by heated rollers 125,126. The rollers 125,126 are preferably heated by coil 138 or by hot water or oil to a temperature greater than the temperature to which it is desired to heat the cathode material. Each of the rollers 125, 126 is of plastic or polished or coated metal. For example, it may be stainless steel or copper. It may be clad on its exterior with a Teflon (tetrafluoroethylene) or a similar non-sticky material to reduce the possibility of cathode material 124 sticking to it.

Figure 8:
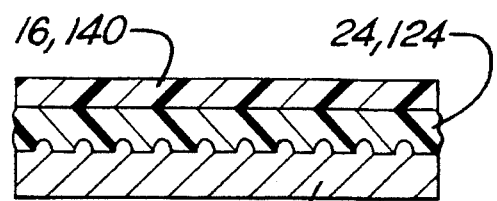

If desired, only one heat station 115 and one compacting station 117 may be used. It is preferred to use multiple stations as shown in FIG. 1. Next, the cathode 124 layer is at least partially cured at a curing station 118. If desired, cathode composition 124 may be uncured or partially cured prior to application of the electrolyte 16, 140. (FIG. 8)

Although the process is shown in the drawing as being in an essentially horizontal orientation, it is to be understood that the process may be conducted in essentially any orientation, for example, rotated 90° or 180° to the orientation shown in the diagram. This is not critical so long as the necessary force or pressure to compact the cathode composition 124 is achieved. The direction of rotation of rollers 125, 126 relative to the direction of movement of the substrate 114 is not critical.

In one embodiment, after partial or total curing of cathode composition 24, 124 and electrolyte 16, 140 alkali metal anode layer 12 is applied to electrolyte layer 16, 140. Although not pictured, a thin polymeric material such as a porous polypropylene sheet may be applied at the edges separating the anode and the electrolyte to ensure that the anode does not contact the cathode layer, particularly at the outer edges of the respective layers. Use of the polymeric material is optional.

In one embodiment, alkali metal anode side 12 may take the form of a single lithium or lithium alloy foil 20; a lithium-coated foil such as nickel or copper foil 18 having a layer of lithium 20 deposited on its surface; or carbon based composite electrode. Examples of lithium alloys include Li—Al, Li—Si, Li—Sn, Li—Cd, Li—Zn, Li—Pb, and Li—N. However, in the most typical embodiment, a lithium foil 20 or lithium-coated metal foil 18, 20 is used. In practice, commercially available foils are used which range from about 50 to 125 microns. Lithium is a preferred anode material because it is very electropositive and light in weight. However, other electropositive alkali metal materials, such as sodium, may be practiced within the scope of the invention.

Figure 9:
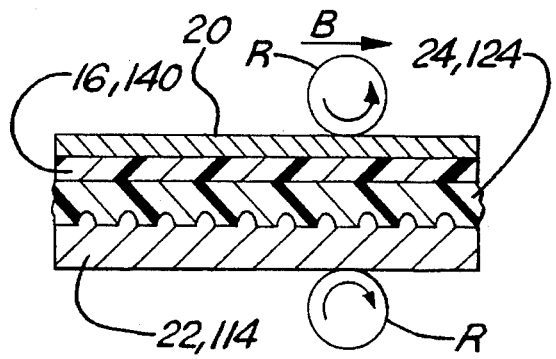
FIG. 9 shows completing the cell 10 using the previously prepared electrode and electrolyte assemblies.

After the anode layer 20 is laminated onto electrolyte 16, 140, the entire assembly is optionally passed through pressure rollers R in the direction of arrow B as shown in FIG. 9. The pressure rolling step aids in the adhesion of the layers to each other, thereby reducing interfacial impedance between component layers.

If the cathode composition 24, 124 anode composition 20, and electrolyte composition 16,140 have not been completely cured, the entire assembly is again cured by exposure to actinic radiation, preferably electron beam radiation, heating and the like. This step functions to solidify the compositions, thereby producing a solid state cell.

Once the current collector, cathode composition, electrolyte composition and anode composition have been assembled, electrodes are attached to the anode and current collector layers by means known in the art. The assembly is then inserted into an air and water impermeable protective material and the edges of the protective material are sealed, preferably by heat sealing around the edges of the cell components. Sealing preferably occurs under vacuum conditions to enable the protective material to form a sealed container 40 around the component layers and electrodes such that the only external access to the component layers is via the electrodes. (FIG. 2)

Examples of heat sealable gas and water permeable protective materials include a multi-layered material having an interior heat sealable layer comprising ethylene acrylic acid, an intermediate barrier layer comprising aluminum foil, and an exterior layer of polyethylene terephthalate. Other heat sealable protective materials known in the art can be used in accordance with the present invention. The protective materials should be as thin as possible to minimize the overall thickness of the cell. Commercially available heat sealable materials of the types described above can have an overall thickness of less than 200 microns.

While this invention has been described in terms of certain embodiments thereof, it is not intended that it be limited to the above description, but rather only to the extent set forth in the following claims.

The embodiments of the invention in which an exclusive property of privilege is claimed are defined in the appended claims.

We claim:

1. A process for making electrode and electrolyte cell assemblies comprising the steps of:

a) forming a first mixture having a total parts by weight of 100 with at least 20 parts by weight and up to 70 parts by weight of a first volatilizable solvent, and a first electrode composition present in an amount of up to 80 parts by weight; said first electrode composition comprising a first aprotic polar solvent, which is less volatile than said first volatilizable solvent, an anode intercalation carbon active material, and first monomers or prepolymers characterized by an ability to form a crosslinked network, said amount of up to 80 parts by weight of said first electrode composition comprising 25 to 85 percent by weight of said anode intercalation carbon active material;

b) forming a second mixture having a total parts by weight of 100 with at least 20 parts by weight and up to 70 parts by weight of a second volatilizable solvent which is the same as or different from said first volatilizable solvent, and a second electrode composition present in an amount of up to 80 parts by weight; said second electrode composition comprising a second aprotic polar solvent which is the same as or different from said first aprotic polar solvent, and which is less volatile than said second volatilizable solvent, a vanadium oxide cathode intercalation active material, a conductive filler, and second monomers or prepolymers characterized by an ability to form a crosslinked network and being the same as or different from said first monomers or prepolymers, said amount of up to 80 parts by weight of said second electrode composition comprising 25 to 85 percent by weight of said vanadium oxide cathode intercalation active material represented by the formula $V_6O_{13}$;

c) applying a coating of one of said first and second mixtures onto a first substrate to provide a first applied coating;

d) removing at least a portion of the volatilizable solvent from said first applied coating of step (c);

e) compacting said first applied coating of step (d) to reduce porosity of said first applied coating;

f) exposing said compacted first applied coating of step (e) to heat, light, or other initiating means to at least partially crosslink the monomers or prepolymers;

g) applying a coating of the other one of said first and second mixtures onto a second substrate to provide a second applied coating;

h) removing at least a portion of the volatilizable solvent from said second applied coating of step (g);

i) compacting said second applied coating of step (h) to reduce porosity of said second applied coating;

j) exposing said compacted second applied coating of step (i) to heat, or other initiating means to at least partially crosslink the monomers or prepolymers; and k) further including after step (e), the further steps of applying an electrolyte composition to said first or said second applied coating, said electrolyte composition comprising third monomer or prepolymers, and exposing said third monomer or prepolymers to heat, light, or other initiating means to at least partially crosslink the third monomers or prepolymers.

2. The process according to claim 1 wherein the further included steps are conducted after step (f).

3. The process according to claim 1 wherein the further included steps are conducted after step (i).

4. The process according to claim 1 wherein the further included steps are conducted after step (j).

5. The process according to claim 1 wherein each of the steps of exposing to initiate crosslinking is done separately.

6. The process according to claim 1 wherein steps (d) and (e) are carried out in sequence and then repeated in sequence before step (f).

7. The process according to claim 1 wherein steps (h) and (i) are carried out in sequence and then repeated in sequence before step (j).

8. The process according to claim 1 wherein steps (d) and (e) are conducted to achieve removal of at least 95 percent by weight of the volatilizable solvent originally present in said mixture and achieve the porosity of less than 5 percent by volume.

9. The process according to claim 1 wherein steps (h) and (i) are conducted to achieve removal of at least 95 percent by weight of the volatilizable solvent originally present in said mixture and achieve the porosity of less than 5 percent by volume.

10. The process according to claim 1 wherein step (d) is conducted by heating to evaporate the volatilizable solvent.

11. The process according to claim 1 wherein step (h) is conducted by heating to evaporate the volatilizable solvent.

12. The process according to claim 1 wherein steps (d) and (e) are conducted essentially simultaneously.

13. The process according to claim 12 wherein the compacting is achieved by rolling the coating and the substrate between opposed rollers.

14. The process according to claim 1 wherein steps (h) and (i) are conducted essentially simultaneously.

15. The process according to claim 14 wherein the compacting is achieved by rolling the coating and the substrate between opposed rollers.

16. The process according to claim 1 wherein step (e) is conducted by applying force of pressure on the side of the coating not in contact with the first substrate.

17. The process according to claim 1 wherein step (i) is conducted by applying force of pressure on the side of the coating not in contact with the second substrate.

18. The process according to claim 1 wherein one or both of said first and second substrates are conductive and usable as a current collector.

19. The process according to claim 1 wherein step (d) is conducted by heating the coating to a temperature at which the volatilizable solvent boils.

20. The process according to claim 1 wherein step (h) is conducted by heating the coating to a temperature at which the volatilizable solvent boils.

* * * * *